US010952120B1

(12) United States Patent
Ozkan et al.

(10) Patent No.: US 10,952,120 B1
(45) Date of Patent: Mar. 16, 2021

(54) ONLINE LEARNING BASED SMART STEERING SYSTEM FOR WIRELESS MESH NETWORKS

(71) Applicant: Sabanci Universitesi, Istanbul (TR)

(72) Inventors: Huseyin Ozkan, Istanbul (TR); Ozgur Gurbuz, Istanbul (TR); Bulut Kuskonmaz, Istanbul (TR)

(73) Assignee: Sabanci Universitesi, Istanbul (TR)

( * ) Notice: Subject to any disclaimer, the term of this patent is extended or adjusted under 35 U.S.C. 154(b) by 20 days.

(21) Appl. No.: 16/591,603

(22) Filed: Oct. 2, 2019

(51) Int. Cl.
| | |
|---|---|
| *H04W 36/00* | (2009.01) |
| *H04W 36/38* | (2009.01) |
| *H04W 36/08* | (2009.01) |
| *H04W 36/30* | (2009.01) |
| *G06N 20/10* | (2019.01) |
| *G06N 5/04* | (2006.01) |
| *H04W 36/16* | (2009.01) |
| *H04W 84/12* | (2009.01) |

(52) U.S. Cl.
CPC ........... *H04W 36/385* (2013.01); *G06N 5/04* (2013.01); *G06N 20/10* (2019.01); *H04W 36/08* (2013.01); *H04W 36/165* (2013.01); *H04W 36/30* (2013.01); *H04W 84/12* (2013.01)

(58) Field of Classification Search
CPC ... H04W 36/385; H04W 36/08; H04W 36/30; H04W 36/165; H04W 84/12; G06N 20/10; G06N 5/04

USPC .......................................................... 370/331
See application file for complete search history.

(56) References Cited

U.S. PATENT DOCUMENTS

| | | | |
|---|---|---|---|
| 8,655,278 B2 | 2/2014 | Laroche et al. | |
| 8,855,625 B2 | 10/2014 | Tipton et al. | |
| 2018/0352497 A1* | 12/2018 | Taskin | H04W 36/08 |
| 2019/0150150 A1* | 5/2019 | Calin | H04L 43/026 |
| | | | 370/329 |
| 2020/0037149 A1* | 1/2020 | Ganu | H04B 17/391 |
| 2020/0068440 A1* | 2/2020 | Talbert | H04W 36/22 |
| 2020/0100155 A1* | 3/2020 | Gupta | H04L 41/0893 |

OTHER PUBLICATIONS

Bak, S., et al., "Guided Tour of Handoff Steering for Bandwidth in Indoor Venues," dated Mar. 9, 2015, pp. 1-6, 2015 IEEE Wireless Communications and Networking Conference, Mar. 9-12, 2015, New Orleans, LA. Electronic ISBN: 978-1-4799-8406-0.

(Continued)

*Primary Examiner* — Robert J Lopata
(74) *Attorney, Agent, or Firm* — Brinks Gilson & Lione (57) ABSTRACT

An online learning-based smart steering system and method comprises an online kernel perceptron classifier. The smart steering approach/method performs learning sequentially at the cloud from the entire data of multiple mesh networks, and, operates at APs for steering; both of which are executed in real-time. The system and method uses network features such as current RSSI (received signal strength indicator), current cost, target RSSI and target cost for every steering action resulting in either success of failure. The system and method uses a classifier based on this data for obtaining a model in the feature space which predicts whether a steering action can succeed or not before it is issued.

9 Claims, 2 Drawing Sheets

(56) References Cited

OTHER PUBLICATIONS

Feng, Z., et al., "Proactive Radio Resource Optimization with Margin Prediction: A Data Mining Approach," dated Oct. 2017, pp. 1-11, IEEE Transactions on Vehicular Technology, vol. 66, Issue 10, Oct. 2017. DOI: 10.1109/TVT.2017.2709622.

Jiang, C., et al., "Machine Learning Paradigms for Next-Generation Wireless Networks," dated Apr. 2017, pp. 1-8, IEEE Wireless Communications, vol. 24, Issue 2, Apr. 2017. DOI: 10.1109/MWC.2016.1500356WC.

Del Testa, et al. "A Machine Learning-Based ETA Estimator for Wi-Fi Transmissions" dated Nov. 2017, pp. 1-14, IEEE Transactions on Wireless Communications, vol. 16, Iss. 11, DOI 10.1109/TWC.2017.2734645.

\* cited by examiner

ONLINE LEARNING BASED SMART STEERING SYSTEM FOR WIRELESS MESH NETWORKS

BACKGROUND

1. Technical Field

The disclosed system relates to effective handling of network resources in wireless networks, ones that employ IEEE 802.11 Wi-Fi. The disclosed system more specifically relates to systems and methods of addressing the sticky client problem in the context of end devices, which, once a connection to an access point (AP) is established, refuse to prompt handoff actions in mesh networks, resulting in less than optimum connection quality and inefficiency in means of network capabilities.

2. Background Information

In a wireless mesh network, a client can remain persistently connected to an access point (AP) even when a better alternative is available. This is known as the sticky client problem, which occurs when the system performs its probing function to observe link metrics, however, a client refuses to roam to the new, more viable access point. This might be due to the incorrect or unstable reporting of the link metrics, or directly the vendors of devices that do not perform the probing well. For instance, when a client phone is picked up and moved to another location, it may stay connected to the AP it was initially connected to for internet access, despite computing a smaller cost for connecting over the closest new AP. As a result of the sticky client problem, enhancements of the mesh network cannot be fully realized, and the persistent connections can starve bandwidth in applications such as video and gaming.

SUMMARY

Steering actions in wireless mesh networks refer to requesting clients to change their access points (APs) for better exploiting the mesh network and achieving higher quality connections. However, steering actions for especially the sticky clients do not always successfully produce the intended outcome. Most traffic handling and client steering efforts in the art are deployed centrally, whereby the best target access point (AP) selection is centrally managed, not at the client level.

In a study titled "Guided tour of handoff steering for bandwidth in indoor venues" by Bak et al. presented in IEEE Wireless Communications and Networking Conference (2015, pp. 1930-1935), a steering scheme to a better AP for the purpose of increasing user throughput, called Guided Tour of Handoff Steering (GUT), is proposed that is computationally and resource-wise inexpensive compared to conventional handoff approaches. Another study titled "Proactive Radio Resource Optimization with Margin Prediction: A Data Mining Approach" by Feng et al. published in IEEE Transactions on Vehicular Technology (Volume: 66, Issue: 10, Oct. 2017) proposes a method of optimizing network configurations with prediction of the resource margin based on historical measurement statistics. To explore the dynamic distribution of user demand and application request, a weighted k-nearest neighbor model is proposed to predict periodic characteristics (denoting different temporal and spatial patterns of radio resource margins) of network traffic. Different machine learning approaches are used in the study "Machine Learning Paradigms for Next-Generation Wireless Networks" published in IEEE Wireless Communications (Volume: 24, Issue: 2, April 2017) by Jiang et al. among which regression models, k-nearest neighbor, SVM and Bayesian learning are found. Study titled "A Machine Learning-Based ETA Estimator for Wi-Fi Transmissions" by Testa et al. in IEEE Transactions on Wireless Communications (Volume: 16, Issue: 11, Nov. 2017) considers different machine learning approaches for an accurate on-the-fly estimation of transmission time, with the goal of exploiting only the information available at each client without modifying any standard communication protocol for cases in which a mobile user needs to decide whether or not to delay a data transfer.

A document known in the prior art, U.S. Pat. No. 8,855,625 B2, discloses a method for dynamically steering traffic across radio access networks comprising intelligence sensing and selection in a traffic steering network. In one aspect, user equipment devices dynamically select a radio access network for connection based on real-time or near real-time radio access network conditions. The criteria can include, but is not limited to, historical patterns, user equipment device behavior, user preferences, service provider preferences and/or policies, access point parameters/reports, location of the access points, location of the macro sites, and so on.

Another document known in the art, U.S. Pat. No. 8,655,278 B2 discloses a method for band steering which includes, with a wireless access point (AP), refraining from responding to a probe request from a client device on a first frequency band until a first period of time has elapsed if said client device is capable of communication on a second frequency band. The method further includes, with the wireless access point, responding immediately to a probe request from said client device on said second frequency band.

State of the art in the field of traffic steering and mesh network resource management, as displayed above, are mainly not machine learning-based, thus are mostly based on certain heuristics or assumptions (without a data driven realistic basis) which may not effectively address the practical even sometimes adverse network conditions. Moreover, unlike the disclosed system and method in this document, they are not computationally scalable, or are not able to solve nonlinear separation/classification problems. None of the methods present in the art displays adaptiveness to non-stationarities or the overall online steering capability.

One primary aspect of the present system and method is to provide smart client steering for wireless networks.

Another aspect of the present system and method is to provide smart client steering for addressing the sticky client problem frequently observed in wireless mesh networks.

Yet another aspect of the disclosed system and method is to provide machine learning based smart steering for large scale wireless mesh networks, which is completely data-driven and computationally highly scalable.

A further aspect of the disclosed system and method is to provide smart steering for wireless mesh networks which is able to model complex non-linear decision boundaries while decently maintaining computational scalability.

A still further aspect of the disclosed system and method is to provide smart steering for wireless mesh networks that is adaptive in real-time to time-varying network statistics via stochastic gradient-based learning.

A still further aspect of the disclosed system and method is to provide smart steering for wireless mesh networks that is operable in real-time due to the introduced online data processing and computational efficiency.

A still further object of the disclosed system and method is to provide smart steering for wireless mesh networks that addresses non-stationarities, regarding the network properties such as the signal power due to client mobility, in the wireless mesh network.

The disclosed system and method provides client steering in wireless mesh networks. An important premise of the system and method lies in that it stems from data emanating (and being extractable) from a steering module in a possibly large-scale wireless mesh network, where outcomes of said steering module are treated as a binary classification problem. Any multiplicity of clients and access points in connection, as well as interfaces, where an interface is essentially the frequency band utilized in the connection between an access point and a client, is considered a network. Said data contain sequences of events, i.e. successful or unsuccessful steering actions, in that the sequence of events represent steering actions pertaining to attempts of guidance of a client to another AP or interface.

The system and method utilizes data-driven machine learning approaches based on analysis of steering modules and identification of conditions under which access point change requests succeed or fail. A binary classification problem centered around various network features and classifiers trained to learn critical regions of successful steering actions in the space of multiple network features is proposed.

The system and method therefore broadly relates to traffic steering in networks, where multiple end devices are connected to multiple access points (AP) in a less-than-optimum fashion; which ends up in a less-than-optimum network resource utility. Such cases are frequently encountered in mesh networks. The system and method, which is a cloud-based online system that assesses the success or failure of the steering actions for clients in Wi-Fi mesh networks, is based on a computationally highly efficient and online non-linear binary classifier through online kernel expansions for generating complex (i.e. difficult as well as obligatory) powerful and foremost timely and data-driven steering decisions in real-time. The system and method is adaptive to the stream of specifically designed network features, namely certain link metrics, for addressing non-stationarities in the network conditions. The system and method also provides great scalability for networks that may potentially be serving hundreds of clients simultaneously.

In an example system and method, two smart steering approaches/methods are disclosed where link metrics i.e. network features such as current RSSI (received signal strength indicator), current cost, target RSSI and target cost are used. Said features constitute altogether a 4-dimensional feature vector for every steering action resulting in either success or failure. The system and method uses training a classifier based on this data for obtaining a model in the feature space which predicts whether a steering action can succeed or not before it is issued. In such, all rules are inferred completely in a data-driven manner without any assumptions, as in practice such assumptions fail to hold.

BRIEF DESCRIPTION OF THE DRAWINGS

Accompanying drawings are given solely for the purpose of exemplifying an adaptive, data-driven, highly scalable and cloud-based online smart steering method for wireless mesh networks, whose advantages over prior art were outlined above and will be explained in brief hereinafter.

The drawings are not meant to delimit the scope of protection as identified in the claims nor should they be referred to alone in an effort to interpret the scope identified in said claims without recourse to the technical disclosure in the description of the present invention.

DETAILED DESCRIPTION

A cloud-based online system and method assesses the success or failure chances of the steering actions for clients in Wi-Fi mesh networks using a cloud based smart steering algorithm (SSA). Said system and method includes circuitry and logic which operates based on a computationally efficient model based upon an algorithm, stored in the cloud, that treats conditions as a learnable classification problem with successful and unsuccessful attempts at steering clients.

As used herein, the term "cloud" refers to a server computer accessible over a network. The server computer may include circuitry, such as a processor and memory storing instructions executable by the circuitry. In an example, the cloud refers to a server accessible over the internet. The cloud may be included as a network resource of the cloud-based online client steering system or may be part of the cloud-based online client steering system. Alternatively or in addition, the cloud may be provided by a third party provider of services accessible over a network by the cloud-based online client steering system.

The cloud-based online client steering system and method targets the sticky client problem which occurs in wireless mesh networks comprising multiple clients and multiple access points (APs), when a network system performs certain probing functions to observe link metrics and executes steering actions (guiding the client onto a different access point) but client(s) corresponding to the executed action(s) refuse(s) to roam to the new AP.

Steering actions in wireless mesh networks refer to requesting clients to change their respective access points to better exploit mesh networks capabilities and achieve higher quality connections, as well as utilizing network recourses ultimately more efficiently. Especially in the sticky client issue, steering actions do not always produce the intended outcome. This proves to be extremely detrimental especially when the number of clients is large in which case a severely non-linear classification problem between the success and failure in the space of network metrics is encountered regarding the steering decisions. Technical problem therefore of the proposed method is to solve, by a detailed and data-driven success/failure analysis of the steering actions, this sticky client issue for large scale wireless mesh networks in a computationally highly efficient and online manner through robust and powerful online kernel expansion while ensuring the real time adaptability to non-stationarities of the network conditions.

The present system and method is structured around the approach that steering module outcomes may be modeled as a binary classification problem, i.e. a success in steering or a failure in steering. Guidance of a client to another access point or interface, as a sequence of events, constitutes a data set of said steering actions. Typically, whenever a client is considered to be better off if it was connected to another access point or interface, then, an appropriate steering action (guidance) is issued. Such an action does not always necessarily result in the intended outcome. The present system and method affords solution thereto by proposing, in a set of known steering actions of number N, successful and unsuccessful steering action labels based on the features pertaining to the conditions a client is particularly subject to. Such features regard the network at the time of a steering action. In an embodiment of the disclosed system and method, said features are: received signal strength indicator (RSSI) and cost of the current as well as the targeted connections of the client.

According to an embodiment of the disclosed system and method, besides received signal strength indicator (RSSI), cost is an end-to-end metric that provides additional information about the connection quality. Measured between the client and the associated access point (AP) or between the root AP with gateway and the other APs, the cost metric per link is computed periodically by checking all possible steering connections, to evaluate initiating a steering action. Cost is therefore considered as a parameter summarizing the environmental, network- or vendor-specific effects on steering actions that are not counted in the remaining features. According to an embodiment of the disclosed system and method, cost per link is calculated as:

$$\frac{50000}{\left\lfloor \frac{R}{20} \right\rfloor + 1}$$

where R is the physical layer link (data) rate.

Current and target signal strength as well as the costs for the current and targeted connections constitute altogether a four-dimensional feature vector for each action, generating the data:

$$x \in R^{N \times 4}$$

along with the feedbacks, i.e. labels:

$$Y \in \{-,1\}^{N \times 1}$$

The approach of the disclosed system and method is to train a classifier based on this data for obtaining a model in the four-dimensional feature space which predicts whether a steering action can succeed or not, before it is issued. In different embodiments, feature space may have a greater dimensionality, and said feature vector(s) may concurrently contain a greater number of features. This classifier suggests a steering outcome on each single point in the feature space, even it is not attempted before by the given steering module. This enables the exploration of the entire space and, also, if need be, the correction of the failing decision points of the existing steering module. This consequently enables decision making as to when exactly a steering action is to be requested. Namely, a decision can be made to not follow the existing module; and instead rely on the ones predicted by the model in the disclosed system and method which readily defines a novel and data-driven, adaptive steering solution that is, due to training with feedback, superior against rule-based non-adaptive versions thereof.

According to an embodiment of the disclosed system and method, a central agent responsible for requesting the steering actions may be simultaneously observing a large number of mesh networks, e.g. a mesh network multiplicity of different apartments in a building, each of which may be serving multiple clients. The devised model f(x) shall be trainable such that it is computationally scalable to such large scale networks with relatively small space complexity and adaptive to non-stationarity, i.e., possible changes in the network behavior. This realistic processing requirement hinders the use of batch techniques and makes online algorithms more favorable. Therefore, the disclosed system and method introduces a classification problem in the online processing framework in which the data is received sequentially in time (then the data is time-indexed as xt, yt without a known horizon like T). At each time, an instance of steering action is received and then the current model is updated based on the feedback. Afterwards, the received instance is discarded without being stored so the storage complexity is significantly small. In this framework of online processing, the computational complexity scales only linearly with the number of processed instances, and thus, scalability can be achieved with limited storage needs.

As a result, steering decision outcomes are sequentially observed in the 4-dimensional vector space, and the goal is to learn an online classifier that is sequentially updated at each time with respect to the observed loss i.e., cross entropy loss, induced by the feedback:

$$y_t \in \{1,-1\}$$

In addition, constant magnitude updates are used, rather than the conventional update diminishing at a 1/t rate, for adaptation to non-stationarity or drifting network parameters. The proposed solution is a data-driven, adaptive and online, essentially a smart steering module which is a significantly novel contribution to the literature and expected to open-up new directions in managing large scale mesh networks.

Figure 1:
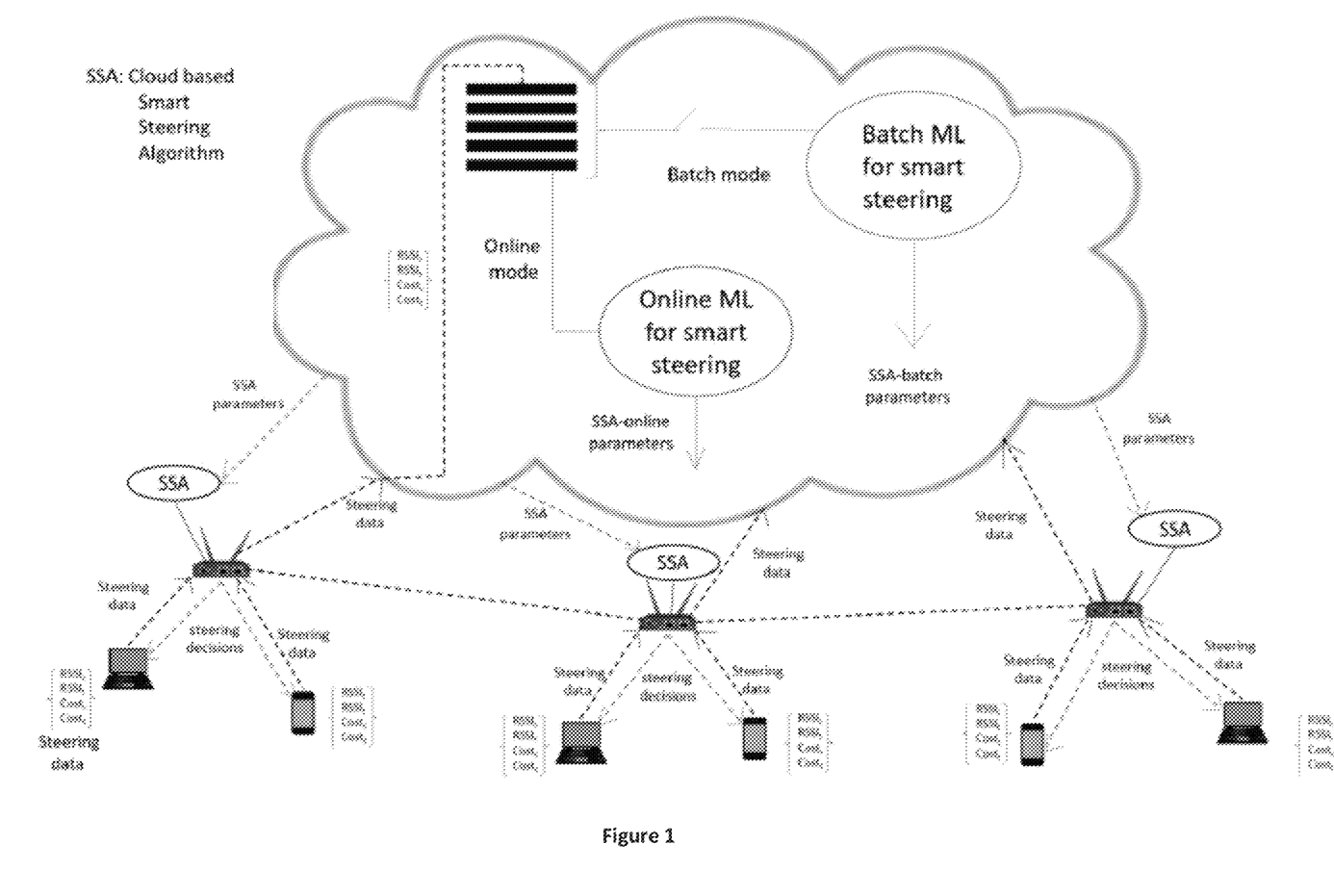
FIG. 1 demonstrates a typical case of an example of the disclosed system including cloud, access points and clients.

In the envisioned system model shown in FIG. 1, steering data of a Wi-Fi mesh network consisting of multiple clients, APs, and interfaces is remotely collected at the cloud. According to an embodiment of the disclosed system and method, a support vector machine (SVM) based consideration of the entire data history, collected from all clients as a batch, is present. Classification according to said SVM may, according to one embodiment, serve as batch machine learning (ML) for smart steering algorithm (which is an algorithm that is developed/trained at the cloud based on the whole data) that is executable at each AP (each AP executing the classification model trained at the cloud; hence the communications from the cloud to the APs only require the sharing of the model parameters).

Batch analysis leading to the development of batch ML for smart steering enables development of the online learning approach, which is named as Online Machine Learning (ML) for Smart Steering. To this end, disclosed system and method exploits a stochastic gradient descent based minimization of the cross entropy loss that leads to Rosenblatt's perceptron in a compact kernel space for online nonlinear classification, which is called "online kernel perceptron". The online kernel perceptron algorithm, which is again executed at each AP but trained at the cloud based on the entire data, considers only instantaneous values of steering data from all clients (the entire data at the cloud is processed by the online technique sequentially in an online manner without storing, whereas the batch technique stores the entire data and uses it repeatedly). Note that in a mesh network, an AP is able to continuously monitor all of the clients and their features. Therefore, in both cases of the envisioned batch or online scenarios, an AP can decide when exactly to issue a successful steering request (for its own clients), while monitoring the clients based on the classifier model it received from the cloud. This gives the disclosed system and method the merit of smart steering.

The method for learning complex, i.e., nonlinear, decision boundaries in the online setting as disclosed in the present system and method exploits one of the central ideas in machine learning for solving nonlinear classification problems, that is, to lift, i.e., transform, the data to a high dimensional space in which the data is linearly separable and hence linear methods are applicable. In addition, methods of the disclosed system does not need to explicitly construct that high dimensional space except the pairwise affinities after the transform, rather, it is sufficient to know the inner products that are encoded by function known as the "kernel". Nevertheless, as kernel techniques (especially in the case of certain kernels such as RBF) in its original form require to compute all of the pairwise kernel evaluations (from test to train) every time an instance is tested, which is usually prohibitively computationally and space-wise complex with even more problematic aspect of training, explicitly but also compactly constructing (though not needed in principle) the high dimensional space through random projections in a compact manner emerges as a way to go.

An example objective of the disclosed system and method is to guarantee online processing, therefore the transformation (i.e. lifting to high dimension) as well as the classifier are both designed online. According to an embodiment of the present system and method, perceptron is selected for the online classifier. For the transformation, a compact kernel expansion via a random set of Fourier projections is selected, which does not disturb online processing.

According to an embodiment of the disclosed system and method, for any two instances such as:

$$x_i, x_j \in R^{d \times 1}$$

from the feature space, we produce the corresponding set of transformed instances such that:

$$x_i, x_j \to z_i, z_j \in R^{2D \times 1}$$

$$k(x_i, x_j)$$

can be approximated arbitrarily well by:

$$z_i^T z_j$$

as D increases. This approximation allows exploitation of computationally efficient online linear learners after the transformation, which is equivalent in principle to training a highly powerful kernel classifier, e.g., SVM with the radial basis function (RBF) kernel, in the original space. The motive behind using the kernel is to replace the conventional similarity, i.e., dot products in the original space since most linear techniques do only rely on dot products, with an appropriate similarity measure encoded by a kernel. This approximation directly embeds that information into an explicitly constructed known space.

According to an embodiment of the disclosed system and method, radial basis function kernel is chosen such that:

$$k(x_i, x_j) = \exp(-g\|x_i - x_j\|^2) \quad (1)$$

where g is the bandwidth parameter. In the batch classification analysis part of the disclosed system and method, the bandwidth parameter g of (1) is empirically determined with 5-fold cross validation in the SVM part and used in the online classification part as is without a need to update. Moreover, any symmetric shift invariant kernel under Mercer's conditions can be used straightforwardly in the presented system and method. In this current embodiment, the rbf kernel is used for only a demonstration with no loss in generality.

The approximation that:

$$k(x_i, x_j) \approx z_i^T z_j$$

is based on random Fourier projections as an application of the Bochner's theorem known in the art. The radial basis function kernel is shift-invariant and symmetric. Considering this, Bochner's theorem reads as follows:

$$\bar{k}(x_i - x_j) = \int_{R^{d \times 1}} p(\alpha) \exp(j\alpha^T(x_i - x_j)) d\alpha$$

$$= \int_{R^{d \times 1}} p(\alpha)(\cos(\alpha^T(x_i - x_j)) + j\sin(\alpha^T(x_i - x_j))) d\alpha$$

(due to Euler's identity)

$$= \int_{R^{d \times 1}} p(\alpha) \cos(\alpha^T(x_i - x_j)) d\alpha$$

(since $k(x_i, x_j)$ is real and symmetric)

$$= E_\alpha[\cos(\alpha^T(x_i - x_j))],$$

$$= E_\alpha[\cos(\alpha^T x_i)\cos(\alpha^T x_j) + \sin(\alpha^T x_i)\sin(\alpha^T x_j)], \text{ where:}$$

$$= E_\alpha[r_\alpha(x_i) r_\alpha^T(x_j)],$$

$$\simeq z_i^T z_j.$$

$$r_\alpha(x) = [\cos(\alpha^T x), \sin(\alpha^T x)]$$

$p(\alpha)$ is a proper probability density, thus $E\alpha(.)$ is the expectation with respect to the multivariate Gaussian density:

$$p(\alpha) = N(\alpha; \mu, \Sigma)$$

with zero mean and covariance of 2 gI, where I is the identity matrix of the appropriate size. Hence, $$z_i = \frac{1}{\sqrt{D}} [r_{\alpha_1}(x_i), r_{\alpha_2}(x_i), \ldots, r_{\alpha_{D-1}}(x_i), r_{\alpha_D}(x_i)]^T \in R^{2D \times 1}$$

is the transform with the desired approximation holding due to the law of large numbers (sample mean approximating the expectation), and $$\{\alpha_1, \alpha_2, \ldots, \alpha_D\}$$

is a set of independent and identically distributed samples generated from said multivariate Gaussian density. Said density is chosen Gaussian for the reason by Bochner's theorem that it is the Fourier transform of the RBF kernel, and as such makes the approach working for any shift-invariant and symmetric kernel selectable under Mercer's condition.

Hence, what is obtained explicitly and in a randomized fashion, is the high dimensional space (which is in fact infinite dimensional) implied by the RBF kernel; wherein dot products approximate kernel values in the original space so that training a linear classifier in the high dimensional space will correspond to nonlinear modeling in the original space as desired. This construct is advantageous for following cases: One can truncate the dimensionality of the transformation to a desired degree so that it fits to the computational requirements of the application at hand; and the rate of convergence is fast, so the quality of the approximation gets better at an exponential rate in D in accordance with Hoeffding's inequality. Thus, the dimension of the transform (D) may be chosen relatively small enabling efficiency regarding the computation of transformation for different embodiments.

Having the kernel space explicitly and compactly constructed via the transform for each instance in a given data stream (without a definitive end), then a linear classifier in the z-space may solve any non-linear classification problem provided that the kernel is chosen suitably, e.g. rbf kernel with an appropriate kernel parameter g. For this purpose, a perceptron which trains a linear classifier in the online setting through stochastic updates is utilized.

A time-indexed online linear classifier as:

$$f_t(x) = w_{t-1}^T x + b_{t-1}$$

parametrized over $$(w_{t-1}, b_{t-1}) \qquad (2)$$

suffers the loss $$l(f_{t-1}(x_t), y_t)$$

at time t. If the loss is chosen as the cross-entropy loss such that $$l(f_{t-1}(x_t), y_t) = -\frac{y_t + 1}{2}\log(\mu_{t-1}) - \left(1 - \frac{y_t + 1}{2}\right)\log(1 - \mu_{t-1})$$

where $$\mu_{t-1} = \frac{1}{1 + \exp(-\nu f_{t-1}(x_t))} \qquad (3)$$

then the stochastic gradient update on the model parameters as given in expression (2), yields $$(w_t, b_t)$$

This essentially defines the perceptron algorithm provided that the sigmoid steepness, v, in expression (3) is sufficiently large.

According to an embodiment of the disclosed system and method, perceptron is applied, after the random kernel expansion, to the transformed stream for online non-linear modeling. Resulting online kernel perceptron is computationally greatly superior over support vector machine algorithm since it sequentially processes data with linear complexity, whereas SVM is a batch algorithm of at least quadratic complexity. Performance-wise, online kernel perceptron is comparable to SVM. From an empirical standpoint, online kernel perceptron is much stronger since it is able to learn even complex separations in the sequential setting in a computationally superior manner.

Online kernel perceptron as disclosed in the system and method can be used as Online Machine Learning (ML) for Smart Steering for large scale networks in the envisioned system model with reference to FIG. 1, in contrast to SVM in the case of Batch ML for Smart Steering for small scale networks. To this end, the online kernel perceptron is sequentially learned in a truly online manner at the cloud based on the entirety of the steering data. The online kernel perceptron is continuously trained at each time at the cloud, and hence, its parameters (the parameters of the resulting linear classifier in the kernel space) are shared at each time to the APs which execute the received model for steering. Note that it is sufficient to share the parameters of the kernel transformation once only at the beginning of the processing, which hence creates almost no complexity and overhead. This does not require a computationally powerful agent at the cloud or a powerful processor at APs, since both the learning of the online kernel perceptron at the cloud as well as its application at APs are of almost negligible space as well as negligible computational complexity. The communication load between the APs and the cloud is still limited (compared to the batch algorithm) since the required number of random Fourier features is relatively small in both theory and practice. As a result, successful steering decisions can be made in real-time by APs for all clients in the network by online ML based smart steering as envisioned in FIG. 1.

Figure 2:
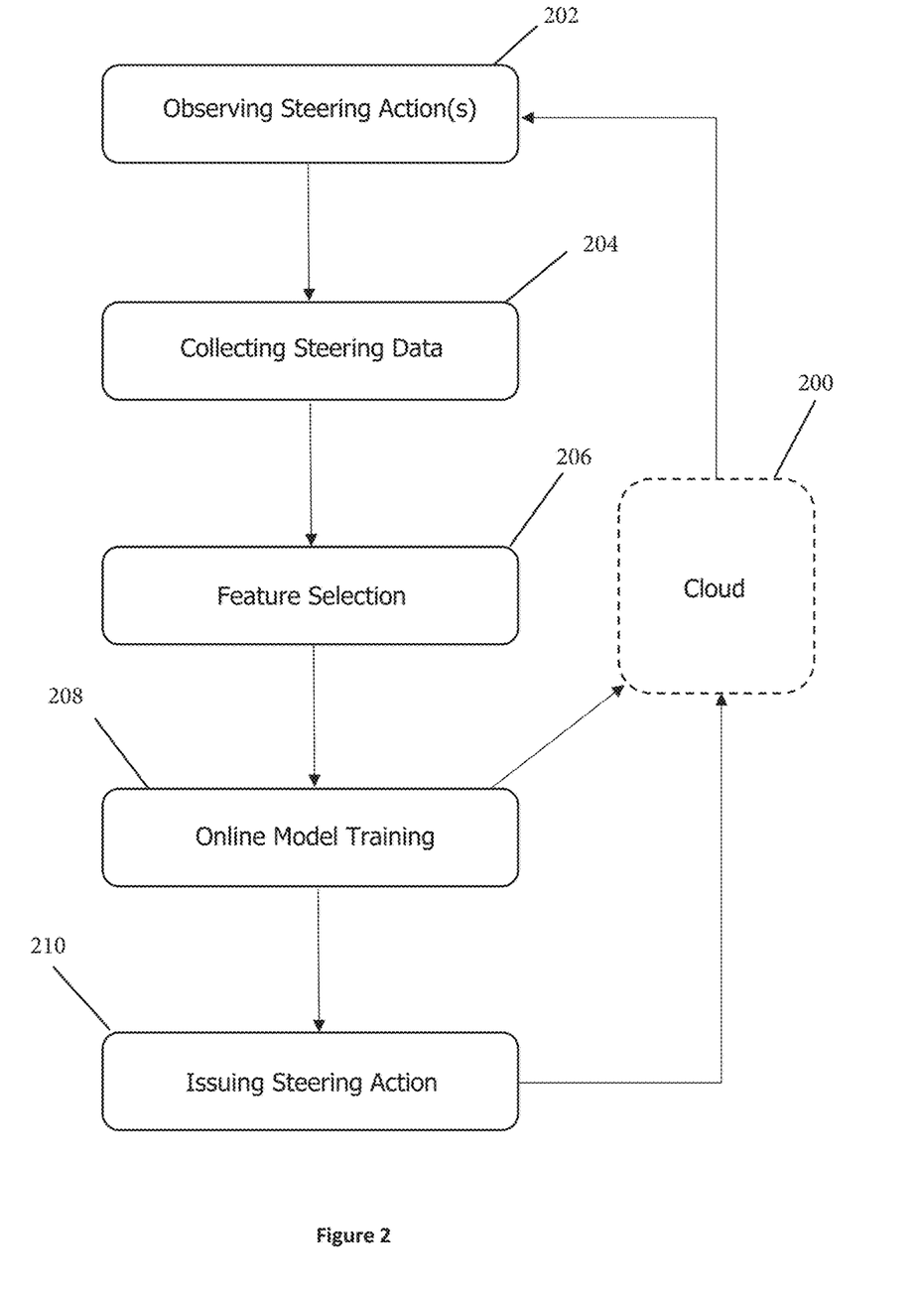
FIG. 2 is a flow diagram of example operation of the disclosed system.

With reference to FIG. 2, according to an embodiment of the disclosed system and method, a cloud-based network traffic steering method for clients in a large-scale wireless mesh network to be employed in a steering module is proposed. Thus, the system may observe steering actions, for example, in the cloud. (200 and 202)

According to an embodiment of the disclosed system and method, a step of data collection is proposed; where data pertaining to instances of steering actions are collected in the cloud. (204) (200)

According to an embodiment of the disclosed system and method, a step of feature selection is proposed; where a plurality of descriptive network features is determined. (206)

According to an embodiment of the disclosed system and method, a step of model training is proposed; where a classification problem is formulated based on the features and at least one classifier is trained to learn the nonlinear critical regions of successful steering actions in collected data. (208) Such training of the at least one classifier may occur in the cloud. (200)

According to an embodiment of the disclosed system and method, a step of steering action taking; where a steering action is taken by a device based on the trained model, is proposed. Thus, a steering action request is issued to the cloud based on the trained model. (210) (200)

According to an embodiment of the disclosed system and method, the classification problem of said model training step is formulated as a support vector machine algorithm such that nonlinearity is achieved.

According to an embodiment of the disclosed system and method, the classification problem of said model training step is formulated as an online data driven kernel perceptron algorithm whereby nonlinearity and computational scalability are achieved.

According to an embodiment of the disclosed system and method, said outcomes of said model training step, namely online kernel perceptron and support vector machine models are switchable in the cloud.

According to an embodiment of the disclosed system and method, said plurality of descriptive network features in said feature selection step are selected from a group including, but not limited to, current RSSI, current connection cost, target RSSI and target connection cost.

According to an embodiment of the disclosed system and method, said data in the data collection step is configured to include a result of a steering action taken by a device utilizing said method enabling sequential and real-time training of said classifiers, whereby adaptiveness to network conditions is achieved.

According to an embodiment of the disclosed system and method, a steering module for clients within a large-scale wireless mesh network characterized employing a client steering method as set forth is proposed.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

The subject-matter of the disclosure may also relate, among others, to the following aspects:

1) A cloud-based network traffic steering method for clients in a large-scale wireless mesh network to be employed in a steering module, comprising steps of;

data collection; where data pertaining to instances of steering actions are collected in the cloud, feature selection; where a plurality of descriptive network features is determined, model training; where a classification problem is formulated based on the features and at least one classifier is trained to learn the nonlinear critical regions of successful steering actions in collected data; and, steering action taking; where a steering action is taken by a device based on the trained model.

2) A cloud-based network traffic steering method for wireless mesh networks as set forth in aspect 1, characterized in that the classification problem of said model training step is formulated as a support vector machine algorithm such that nonlinearity is achieved.

3) A cloud-based network traffic steering method for wireless mesh networks as set forth in aspects 1 and 2, characterized in that the classification problem of said model training step is formulated as an online data driven kernel perceptron algorithm whereby nonlinearity and computational scalability are achieved.

4) A cloud-based network traffic steering method for wireless mesh networks as set forth in aspects 1 to 3, characterized in that said outcomes of said model training step, namely online kernel perceptron and support vector machine models are switchable in the cloud.

5) A cloud-based network traffic steering method for wireless mesh networks as set forth in any preceding aspect 1-4, characterized in that said plurality of descriptive network features in said feature selection step are selected from a group including, but not limited to, current RSSI, current connection cost, target RSSI and target connection cost.

6) A cloud-based network traffic steering method for wireless mesh networks as set forth in any preceding aspect 1-5, characterized in that said data in the data collection step is configured to include a result of a steering action taken by a device utilizing said method enabling sequential and real-time training of said classifiers, whereby adaptiveness to network conditions is achieved.

7) A steering module for clients within a large-scale wireless mesh network characterized in that said module is configured to execute a client steering method as set forth in aspect 1.

While various embodiments have been described, it will be apparent to those of ordinary skill in the art that many more embodiments and implementations are possible. Accordingly, the embodiments described herein are examples, not the only possible embodiments and implementations.

The invention claimed is:

1. A method comprising:
observing steering actions employed in a cloud-based network traffic steering system for clients in a large-scale wireless mesh network;
data collection; where data pertaining to instances of steering actions are collected in the cloud,
feature selection; where a plurality of descriptive operational network features are determined at a time of each respective steering action instance,
model training; where a classification problem with successful steering actions and unsuccessful steering actions is formulated based on the descriptive operational network features, and at least one classifier model is trained to learn nonlinear critical regions of successful steering actions in the collected data; and
issuing a steering action request to a client device in the large-scale wireless mesh network at an instance where a steering action is taken by the client device, the steering action request issued based on identification, with the trained at least one classifier model, of a non-linear critical region of successful steering actions being present in the large-scale wireless mesh network during the instance.

2. The method set forth in claim 1, wherein the classification problem of said model training step is formulated as a support vector machine algorithm such that nonlinearity is achieved.

3. The method as set forth in claim 1, wherein the classification problem of said model training step is formulated as an online data driven kernel perceptron algorithm whereby nonlinearity and computational scalability are achieved.

4. The method as set forth in claim 1, wherein said outcomes of said model training step, namely online kernel perceptron and support vector machine models are switchable in the cloud.

5. The method as set forth in claim 1, wherein said plurality of descriptive operational network features in said feature selection step are selected from a group including, but not limited to, current received signal strength indicator (RSSI), current connection cost, target RSSI and target connection cost.

6. The method as set forth in claim 1, wherein said data in the data collection step is configured to include a result of a steering action taken by a device utilizing said method enabling sequential and real-time training of said at least one classifier, whereby adaptiveness to network conditions is achieved.

7. The method of claim 1, wherein the cloud comprises a server computer accessible over the internet.

8. A system comprising:
- a processor configured to execute instructions stored in non-transitory memory to observe steering actions employed in a cloud-based network traffic steering system for clients in a large-scale wireless mesh network;
- the processor further configured to execute instructions stored in memory to collect data; where data pertaining to instances of steering actions are collected in the cloud;
- the processor further configured to execute instructions stored in memory to select features; where a plurality of descriptive operational network features are determined at a time of each respective steering action instance;
- the processor further configured to execute instructions stored in memory to train a model; where a classification problem with successful steering actions and unsuccessful steering actions is formulated based on the descriptive operational network features, and at least one classifier model is trained to learn nonlinear critical regions of successful steering actions in the collected data; and
- the processor further configured to execute instructions stored in memory to issue a steering action request to a client device in the large-scale wireless mesh network at an instance where a steering action is taken by the client device, the steering action request issued based on identification, with the trained at least one classifier model, of a non-linear critical region of successful steering actions being present in the large-scale wireless mesh network during the instance.

9. The system of claim 8, wherein the cloud comprises a server computer accessible over the internet.

* * * * *